United States Patent
Perrier

(10) Patent No.: US 11,878,547 B1
(45) Date of Patent: Jan. 23, 2024

(54) DIAMOND ART CANVAS

(71) Applicant: Diamond Art Club, LLC, Miami, FL (US)

(72) Inventor: Alexandre Perrier, Los Angeles, CA (US)

(73) Assignee: Diamond Art Club, LLC, Miami, FL (US)

( * ) Notice: Subject to any disclaimer, the term of this patent is extended or adjusted under 35 U.S.C. 154(b) by 0 days.

(21) Appl. No.: 18/214,129

(22) Filed: Jun. 26, 2023

Related U.S. Application Data

(63) Continuation-in-part of application No. 18/305,289, filed on Apr. 21, 2023, now Pat. No. 11,772,414.

(51) Int. Cl.
| | |
|---|---|
| *B44C 1/18* | (2006.01) |
| *B32B 7/12* | (2006.01) |
| *B32B 3/16* | (2006.01) |
| *B32B 5/02* | (2006.01) |
| *B32B 27/36* | (2006.01) |
| *B44C 3/02* | (2006.01) |
| *B32B 27/12* | (2006.01) |

(52) U.S. Cl.
CPC .................. *B44C 1/18* (2013.01); *B32B 3/16* (2013.01); *B32B 5/022* (2013.01); *B32B 5/024* (2013.01); *B32B 7/12* (2013.01); *B32B 27/12* (2013.01); *B32B 27/36* (2013.01); *B44C 3/02* (2013.01); *B32B 2255/02* (2013.01); *B32B 2255/26* (2013.01); *B32B 2262/065* (2013.01); *B32B 2307/54* (2013.01); *B32B 2451/00* (2013.01)

(58) Field of Classification Search
CPC .... B44C 1/18; B44C 3/02; B32B 3/16; B32B 5/22; B32B 5/24; B32B 7/12; B32B 27/12; B32B 27/36; B32B 2255/02; B32B 2255/26; B32B 2262/065; B32B 2307/54; B32B 2451/00
See application file for complete search history.

(56) References Cited

U.S. PATENT DOCUMENTS

2017/0316713 A1    11/2017   Hyman

*Primary Examiner* — Edward J Cain
(74) *Attorney, Agent, or Firm* — KOS IP Law LLP

(57) ABSTRACT

A diamond art kit includes a diamond art canvas which includes a substrate upon which an image is printed. A layer of adhesive is applied above the image, and a protective film (which can have perforated tear lines) releasably covers the adhesive. The substrate includes a textile layer that can be sealed by front and back sealing layers. A backing layer can be applied to the back sealing layer. The backing layer can be configured with fibers that are sufficiently flexible to allow the diamond art canvas to be rolled and placed within a tube for storage and shipping, but also has sufficient tensile strength to urge the diamond art canvas toward laying flat when unrolled.

18 Claims, 3 Drawing Sheets

DIAMOND ART CANVAS

CROSS-REFERENCE TO RELATED APPLICATIONS

The present application is a Continuation-in-Part of U.S. application Ser. No. 18/305,289, filed Apr. 21, 2023. This application shares subject matter with U.S. application Ser. No. 17/390,489, filed Jul. 30, 2021 and Ser. No. 18/305,289, filed Apr. 21, 2023, the entirety of each of which is hereby incorporated by reference.

BACKGROUND

The present disclosure relates to hobby art, and more particularly to diamond painting.

Diamond painting is a form of mosaic art in which small beads, referred to as jewels, diamonds or drills, are attached to a sticky canvas. Typically the canvas is pre-printed with an image divided into a grid of spaces. Each space includes a symbol corresponding to a particular color of drill, and the user places appropriate drills into spaces in order to create the image, similar to the paint-by-numbers concept.

A diamond art canvas includes a substrate that makes up the structural support for the canvas. The substrate can include a flexible textile with one or more layers, including a print layer configured to receive an image printed thereon. An adhesive layer is applied to the substrate atop the print layer so as to hold the drills that are placed thereon. A plastic protective film is disposed over the adhesive. During diamond painting, the user will peel back the protective film in order to access and place drills onto the canvas. After some time, the user may wish to take a break from diamond painting, and will re-place the protective film in order to protect the remaining exposed adhesive.

Upon manufacture, a diamond art canvas typically is rolled up and deposited into a cylindrical tube for storage and shipping. To use the diamond art canvas, a consumer will remove it from the tube, unroll it, and proceed to place drills for diamond painting. Due to the various layers and materials used, the canvas may be liable to wrinkle, curl at the ends, or otherwise tend to not lay flat.

SUMMARY

The present specification discloses aspects that improve a diamond art canvas by reducing its tendency to wrinkle and curl. The improved canvas has a backing layer that is flexible enough to allow the diamond art canvas to be rolled and placed in a cylindrical tube for storage and shipping, but also urges the canvas toward a lying-flat disposition, thus resisting curling of the edges of the canvas and resisting wrinkling. The backing layer is a composite of fibers entrained in an adhesive, and is cured in a manner so that when the diamond canvas is laid flat, the fibers are generally straight. The fibers may have their lengths extend generally within a plane or may be randomly placed such as by spraying the bamboo fibers into the adhesive. When the diamond canvas is rolled up and placed in a tube for shipping, the fibers will bend. When the diamond canvas is taken out of tube, the fibers will urge the diamond canvas back to the flat configuration to thereby prevent wrinkles. Put simply, the fibers embedded within the adhesive will urge the backing layer, and thus the entire diamond art canvas, towards a lying-flat disposition. In order to accomplish this the fibers have a tensile strength between about 700-2000 MPa and a Young's modulus between about 15-45 GPa. The fibers for the backing layer can be bamboo fibers configured and treated to have suitable properties.

In some variations the fibers may have a tensile strength between about 900-1800 MPa and a Young's modulus between about 20-40 GPa. In still further variations the fibers can have a tensile strength between about 930-1770 MPa and a Young's modulus between about 15-45 GPa.

In accordance with one embodiment, the present disclosure comprises a diamond art canvas, comprising a substrate having a front side and a back side. The substrate comprises a flexible textile, a print layer defined on a front side of the textile layer, and a backing layer defined on a back side of the textile layer. An image is printed upon the print layer, the image including a plurality of markers with unique printed indicia. An adhesive is applied to the image surface. A plurality of unique diamond drills are attachable to the substrate via the adhesive and attachable in a pattern corresponding to the unique printed indicia. A protective film is disposed atop the adhesive, the protective film configured to be releasably removed from and reengaged with the adhesive. The backing layer comprises a composite comprising a plurality of fibers entrained in an adhesive, each of the plurality of fibers having a length. The backing layer is configured so that an at-rest condition of the fibers in the backing layer is generally planar. The fibers have a tensile strength greater than about 700 MPa and a Young's modulus greater than about 15 GPa.

In some variations the fibers have a tensile strength less than about 2000 MPa and a Young's modulus less than about 45 GPa. In further variations the fibers have a tensile strength greater than about 900 MPa and less than about 1800 MPa and a Young's modulus greater than about 20 GPa and less than about 40 GPa. In further variations the fibers can have a Young's modulus greater than about 25 GPa.

In additional variations the fibers comprise bamboo fibers.

In still further variations the fibers have a tensile strength between about 930-1770 MPa and a Young's modulus of between about 26-35 GPa.

The plurality of fibers can be randomly disposed in the backing layer.

Additional variations can additionally comprise a cylindrical tube having a diameter, wherein the fibers are selected to be flexible enough so that the diamond art canvas can be rolled up and deposited into the tube, and the fibers are selected to be stiff enough so that when the diamond art canvas is removed from the tube and unrolled the backing layer urges the diamond art canvas toward a planar at-rest configuration.

In accordance with another embodiment, the present specification discloses a method of making a diamond art painting kit. The method includes forming a substrate, which comprises applying a back sealing layer to a back side of a textile layer, applying a front sealing layer to a front side of the textile layer, and applying a backing layer behind a back side of the textile layer. The backing layer comprises a composite having a plurality of fibers entrained in an adhesive, each of the plurality of fibers having a length, the fibers having a tensile strength greater than about 700 MPa and a Young's modulus greater than about 15 GPa. The method can further comprise curing the backing layer when the textile layer is lying flat so that an at-rest configuration of the fibers in the backing layer, when cured, is generally planar.

Some variations additionally comprise applying an image to a front surface of the substrate, applying an adhesive layer atop the image, and applying a removable protective film to the adhesive layer.

Further variations additionally comprise rolling the diamond art canvas and placing the rolled diamond art canvas into a cylindrical tube.

In some variations the backing layer is applied prior to the image being applied.

In additional variations, the fibers of the composite layer are bamboo fibers.

The fibers of the composite layer can have a tensile strength between about 900-1800 MPa and a Young's modulus between about 20-40 GPa.

The fibers of the composite layer can have a tensile strength between about 930-1770 MPa and a Young's modulus of between about 26-35 GPa.

The fibers of the composite layer can be bamboo fibers.

In some variations, applying the backing layer comprises applying an adhesive to the back sealing layer and flocking bamboo fibers onto the adhesive.

In further variations, applying the backing layer comprises applying an adhesive to the back sealing layer and applying a textile comprising bamboo fibers onto the adhesive.

DESCRIPTION

Figure 1:
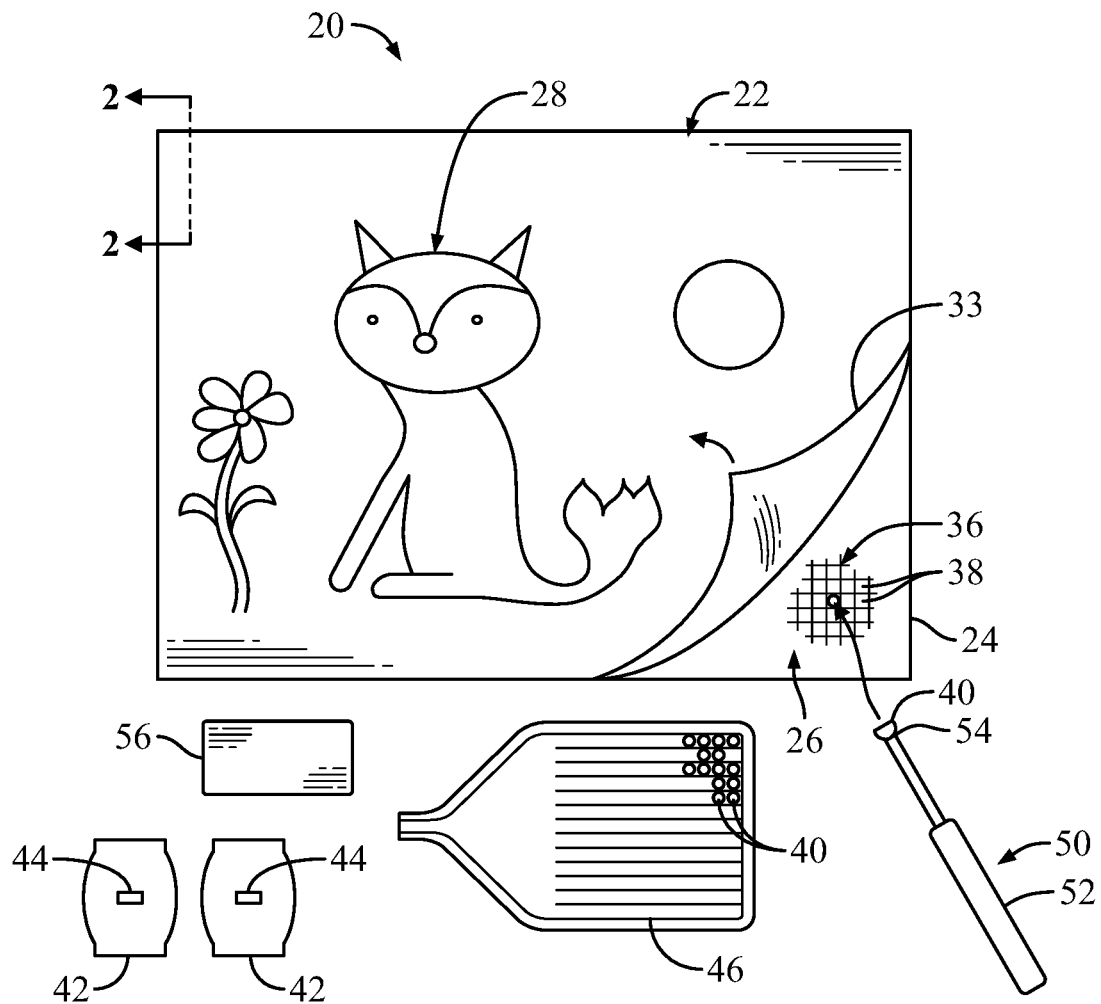
FIG. 1 is a schematic view of an embodiment of a diamond art kit.

The present specification discloses an improved diamond art canvas that is flexible enough to be rolled and placed in a cylindrical tube for storage and shipping, but also tends toward a lying-flat disposition after removal from the tube, resisting curling of the edges of the canvas and resisting wrinkling.

A diamond art canvas 22 includes a substrate 24 having an image surface 26 upon which a layer of adhesive 30 (see FIG. 2) is deposited. A protective film 33 sits atop the adhesive 30. The substrate 24 includes a flexible textile layer 80. A backing layer 90 (see FIG. 7) of the substrate 24 is made up of fibers entrained in an adhesive. The backing layer 90 is cured in a manner so that when at rest, the fibers have their lengths extending generally within a plane. The fibers thus will urge the backing layer 90—and thus the entire diamond art canvas 22—towards a lying-flat disposition. To effectively accomplish this the fibers have a tensile strength between about 700-2000 MPa and a Young's modulus between about 15-45 GPa. The fibers for the backing layer can be bamboo fibers configured and treated to have suitable properties.

In some variations the fibers may have a tensile strength between about 900-1800 MPa and a Young's modulus between about 20-40 GPa. In still further variations the fibers can have a tensile strength between about 930-1770 MPa and a Young's modulus between about 15-45 GPa.

Figure 2:
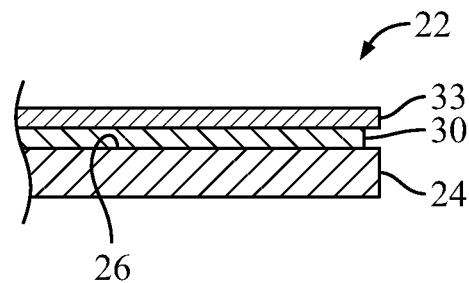
FIG. 2 is a cross-sectional view taken along line 2-2 of FIG. 1.

With initial reference to FIGS. 1 and 2, a diamond art kit 20 includes a canvas 22 comprising a substrate 24 having an image surface 26 (see FIG. 2) upon which an image 28 is printed. A layer of adhesive 30 is applied over the image surface 26. A protective film 33 is applied atop the adhesive 30. As shown, the protective film 33 can be peeled back to expose the adhesive 30.

The image 28 is divided into a grid 36 defining spaces 38, each of which includes a symbol. A plurality of drills 40 are provided. Drills are an industry term for clear or colored faceted resin bodies that absorb and reflect light similar to diamonds. It is anticipated that one drill 40 will be placed in each space 38. The symbol in each space corresponds to a particular color of drill 40, and the user is to place the corresponding drill 40 in each space 38 so as to create a mosaic matching the printed image 28. The drills 40 typically are resin beads having a flat side for placement on the image surface 26, and a plurality of facets adapted to produce a shimmering, reflective effect. Drills 40 are also sometimes called diamonds, gems, or rhinestones, and can be made of a variety of materials and also have a variety of specific shapes.

With continued reference to FIG. 1, the drills 40 often are provided in bags 42 which preferably have a label 44 corresponding to, for example, the symbol associated with the particular drill color contained in the bag 42. In use, a user will often pour several drills 40 into a tray 46 configured to support them with the facet-side up. An elongated applicator 50 can include a handle 52 and a tip 54.

To place a drill 40, a user first peels the protective film 33 back, exposing the adhesive 30. The user then dips the tip 54 of the applicator 50 into a wax pad 56. The wax 56 provides a light adhesive affect so that when the user applies the tip 54 onto the facet side of a drill 40 in the tray 46, the drill will stick to the tip 54 (as shown in FIG. 1). The user can then apply the drill 40 to the corresponding space 38. Once applied to the space 38, the strong adhesive 30 will hold the drill 40 in place on the canvas 22, and the applicator 50 can be removed. As shown, however, peeling back the protective film 33 can expose far more of the adhesive 30 than is necessary for placing the drill 40 in the space 38.

The protective layer 33 can be configured as a unitary film applied to the adhesive 30. However, with reference next to FIG. 3, in one variation, the protective layer 33 comprises a plurality of tear lines 60 at which the protective film 33 is biased to preferentially tear. In the variation shown in FIG. 3, the protective film 33 can be divided by the tear lines 60 into sections A1-A25. A user thus may tear the protective film 33 along one or more of the tear lines 60 in order to expose one or more of the sections A1-A25 while keeping the protective film 33 in place on the remaining sections. This limits exposure of the adhesive to only the section upon which the user is currently working.

Figure 3:
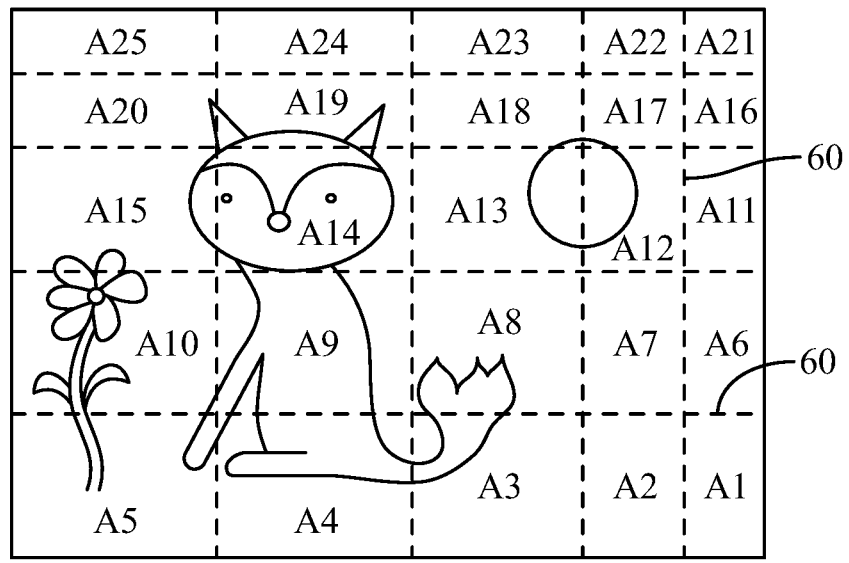
FIG. 3 shows a variation in which a diamond art canvas has a protective film with a plurality of tear lines dividing the protective film into sections.

In the variation shown in FIG. 3, each tear line 60 is straight and parallel to one of the edges of the canvas 22. As such, each section A1-A25 forms a rectangular shape. The illustrated variation also has sections of various sizes so that a user can choose to open a larger or smaller section depending on how much time they wish to spend working on their diamond painting. It is to be understood that variations can be configured so that all sections are the same size, and variations can also be configured with sections of various sizes and shapes, in which tear lines 60 may or may not be parallel to one another and may or may not extend across the entire canvas 22.

Figure 4:
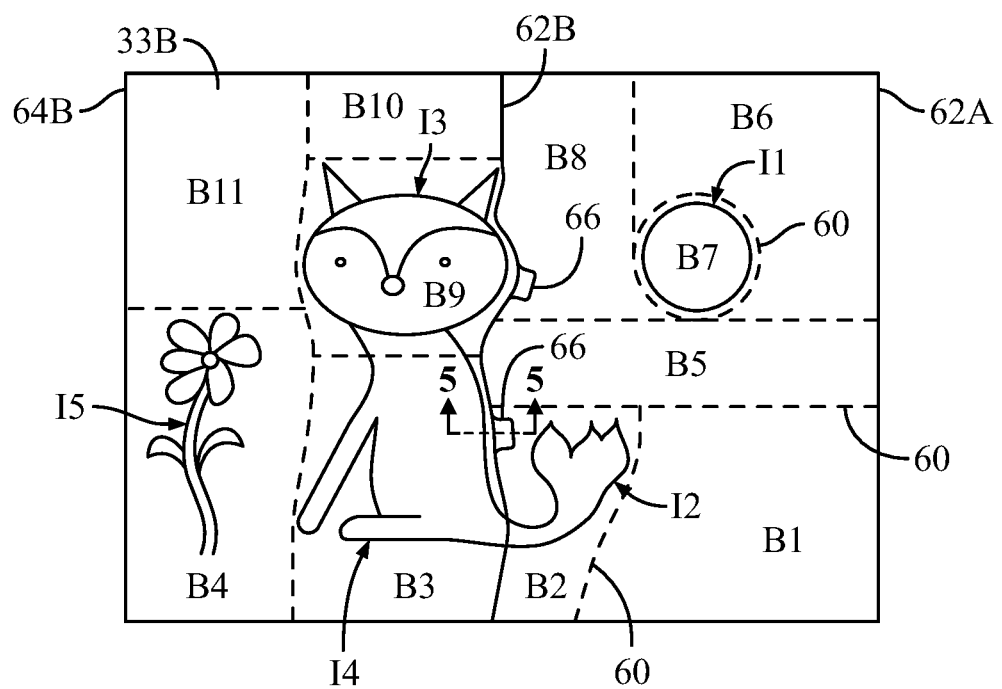
FIG. 4 shows another variation in which a diamond art canvas has a protective film with a plurality of tear lines dividing the protective film into sections.

In the variation depicted in FIG. 3, the tear lines 60 are placed without consideration of the underlying image 28 printed on the canvas 22. With reference next to FIG. 4, an additional variation is depicted in which tear lines 60 of the protective film 33 are arranged to define sections B1-B11 that generally conform to at least some image features I1-I5 of the image 28. For example, image feature I1 in the illustrated image 28 appears to be a round sun. A correspondingly round tear line 60 circumscribes this image feature I1, defining section B7, which corresponds to this image feature I1. As such, a user wishing to work on this particular image feature I1 can tear out and remove section B7 of the protective film 33 to expose the image feature I1 so drills 40 can be appropriately placed on this portion of the canvas 22 while adhesive 30 in surrounding sections remains protected. Similarly, image features including the tail 12, head 13 or body 14 of a fox are respectively defined by sections B2, B9 and B3. Such sections can be defined as broadly or narrowly as desired. For example, section B7 is made up almost entirely of the sun of image feature I1, but section B2 includes not only the tail of image feature 12, but also surrounding environmental features. It is to be understood that sections can be defined even more narrowly—such as a separate section for each of the petals of the flower in image feature 15.

Figure 5:
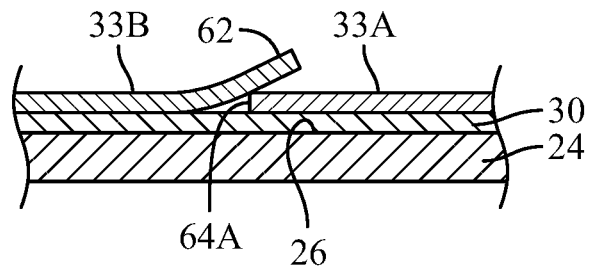
FIG. 5 is a cross-sectional view taken along lines 5-5 of FIG. 4

FIGS. 4 and 5 also depict another variation in which the protective film 33 comprises multiple separately-formed films, here a first protective film 33A and a second protective film 33B. The first protective film 33A extends from a first end 62A that is aligned with an edge of the canvas 22 to a second end 64A positioned midway across the canvas 22. The second protective film 33B extends from a first end 62B that is generally aligned with and adjacent the second end 64A of the first protective film 33A to a second end 64B that is aligned with an opposing edge of the canvas 22. Tabs 66 can be provided along the first edge 62B, which tabs 66 overlap the second edge 64A so as to help a user obtain purchase on the second protective film 33B.

In some variations the sections B1-B11 can be configured to correspond to one or a limited number of colors of drills 40, so that when a user removes the protective film 33 within a particular section only a limited number of different types of drills 40 will be used for the exposed portion. In some variations the drills 40 can be packaged in bags 42 corresponding to particular sections. In such instances a label 44 of a bag 42 can correspond to a particular section B1-B11, which section number can be printed, for example, on the appropriate location of the protective film 33. A limited number of different types of drills 40 can correspond to that section, and each different type of drill 40 can be placed in its own bag (and with its own label) within the larger bag 42 that corresponds to the selected section. Thus, each section's drills 40 can be separately bagged for the convenience of the user in 1) exposing only the particular section being worked on in that diamond painting session; and 2) opening bags only for drills 40 being placed in that particular section. Thus, exposure of adhesive 30 is limited, and exposure of loose drills 40 is also limited to only those drills 40 relevant to the particular section.

As shown in FIG. 4, the tear lines 60, and first ends 62B, can be straight, curved, or combinations of straight and curved portions. Also, it is to be understood that various materials can suitably be used for the substrate 24, adhesive 30 and protective film 33. For example, typically the substrate comprises a flexible fabric having one or more layers, which layers can comprise woven and/or non-woven textiles. Also, the adhesive can be a poured or sprayed adhesive layer, and in some variations can be a double-sided adhesive film or other structure and method used for applying adhesive atop the image surface 26.

The protective film 33 can be formed of a variety of flexible materials, mostly plastics, that are configured to releasably adhere to the adhesive 30. In one variation the protective film 33 comprises a polyethylene terephthalate (PET) film having a thickness about 3.8c (0.38 mm) and having a silica oil coating. Such a film, and other acceptable films, can be obtained from manufacturers such as Dow Corning. In one variation the tear lines 60 comprise lines of perforations through the protective film 33, and it is desired that the perforations are such that the protective film 33 tears readily along the tear lines 60. In one variation the PET film mentioned above is used as the protective film 33, and the tear lines 60 are made up of elongated perforations through the film, each elongated perforation having a cut length of 4 mm, and an uncut space between adjacent perforations is 0.5 mm. Other variations can include a similar, 8:1 ratio of cut/uncut portions defining the tear lines, or may employ greater or lesser ratios as desired and/or as allowed by the film material.

Figure 6:
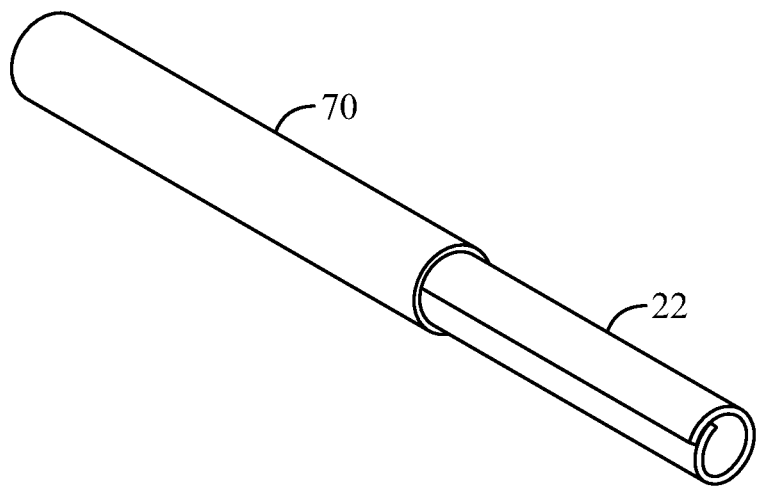
FIG. 6 is a perspective view depicting a rolled-up diamond art canvas being removed from a storage tube.

Upon manufacture, a diamond art canvas 22 typically is rolled up tightly and deposited in an elongated, cylindrical tube 70 for storage and shipping. Depending on the size of the canvas 22, it may be rolled so as to have a rolling diameter of about ½ inch to 5 inches, and more likely between about 1-3 inches. With reference next to FIG. 6, to use the diamond art canvas 22, a user will remove it from the tube 70, unroll it to lay it flat, and proceed with diamond painting.

Figure 7:
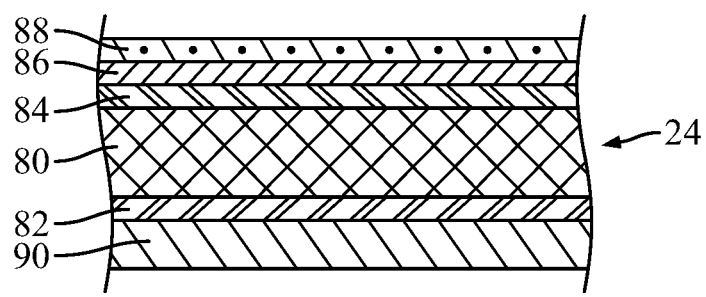
FIG. 7 is a cross-sectional view schematically showing layers of a substrate of a diamond art canvas.

As discussed above, the diamond art canvas 22 comprises a substrate 24 having a front surface upon which the adhesive 30 is deposited and the protective film 33 is placed atop the adhesive 30. With reference next to FIG. 7, the substrate 24 comprises multiple layers. A textile layer 80 can be made of a woven cloth, such as an oxford-woven cloth, or a non-woven cloth, and can be formed from chemical or natural fibers. The textile layer 80 typically makes up a majority of the thickness of the substrate 24. A back side of the textile layer 80 can be coated and treated with, for example, an acrylic acid so as to form a back sealing layer 82 that coats and seals gaps in the textile layer 80. A front side of the textile layer 80 can also be coated and treated with, for example, an acrylic acid so as to form a front sealing layer 84 that coats and seals gaps in the textile layer 80.

With continued reference to FIG. 7, a print layer 86 can be formed on or above—and fixedly connected to—the front sealing layer 84. In some variations the print layer 86 can be formed by coating the surface of the front sealing layer 84 with, for example, an acrylic emulsion and heat drying at or around 150° C. to form a film configured to acceptably receive inks. Optionally, a flash layer 88, which may include visual effect-enhancing materials such as paillettes, can be applied to the print layer 86. The image surface 26 is defined as the front surface of the print layer 86, or flash layer 88 if so equipped. As depicted in FIG. 3, the adhesive 30 can be applied atop the image surface 26.

Each of the above-described layers have properties that may be liable to wrinkling or remaining at least partly curled when the canvas 22 is unrolled for use. In some variations, a backing layer 90, comprising a composite of fibers entrained in an adhesive matrix, is applied to or behind the back sealing layer 82 and is configured to urge the substrate 24—and entire canvas 22—to lie flat and minimize wrinkling. The fibers of the backing layer 90 can be disposed embedded within an adhesive layer. The fibers embedded within the adhesive layer urges the diamond canvas to lay flat after it is removed from the shipping tube.

In some variations the backing layer 90 is applied to the back sealing layer 82 when the layers are in a flat disposition. Preferably, the fibers are applied so that their lengths are randomly embedded within an adhesive or the fibers may substantially lie in the plane of the backing layer when lying flat. Also, preferably the fibers are applied randomly so that elongated fibers extend in all directions within the plane. Such application can be, for example, via entraining the fibers within an adhesive matrix that gets applied to the back sealing layer 82, by flocking the fibers onto an adhesive layer, by attaching and adhering a woven or non-woven cloth containing the fibers thereto, or the like when the canvas is flat.

The fibers should be chosen to have sufficient elasticity to accommodate rolling of the diamond art canvas 22 to a diameter of about 1-3 inches without exceeding the elastic limit of the fiber when the diamond art canvas is rolled up and placed in a shipping tube, but sufficient stiffness to urge the canvas 22 back to the fibers' at-rest position in which the diamond art canvas 22 can lay flat, substantially without wrinkles or curved edges. It has been determined that fibers having a length of about 1-10 mm (preferably 1 to 4 mm) and a tensile strength greater than about 700 MPa, or more preferably greater than about 900 MPa, and/or a Young's Modulus of greater than about more preferably greater than about 20 GPa, and even more preferably greater than about will sufficiently bias the diamond art canvas 22 to lie flat so as to overcome most or all of the tendency of other layers to wrinkle or maintain a curve when being unrolled after being rolled up for some time. In order to accommodate such rolling, however, it has been determined that fibers should have a tensile strength less than about 2000 MPa, and more preferably less than about 1800 MPa, and/or a Young's modulus less than about 45 GPa, and more preferably less than about so as to allow rolling of the canvas 22 as needed to place the canvas 22 in the tube 70 for storage and transport.

In some variations, the backing layer 90 comprises a composite material comprising bamboo fibers entrained in an adhesive matrix. The bamboo fibers can have an average length between about 10-40 mm and an average diameter of about 10-30 μm. Such bamboo fibers can be chemically or mechanically treated and can have a tensile strength between about 930-1770 MPa and/or a Young's modulus of between about 26.85-34.62 GPa, or about 26-35 GPa. The bamboo fibers preferably are applied within the backing layer 90 so as to, when at rest, lie at a plane. In other words, the bamboo fibers may be entrained in the adhesive matrix when the diamond art canvas is in a flat position. After entraining the bamboo fibers in the adhesive matrix, the adhesive matrix is allowed to cure while flat. In this regard, when the diamond art canvas is rolled up, the fibers bend within the adhesive matrix but does not exceed its elastic limit. When the diamond art canvas is removed from the tube, the fibers help to bias the diamond art canvas to the flat position or its original position when it was first cured (i.e., in the flat position). In some variations, the bamboo fiber backing layer 90 can comprise an adhesive upon which bamboo fiber are flocked, typically using a puffer or blown application method so that the fibers are randomly applied with their lengths oriented randomly and within the plane of the backing layer 90 (and applied adhesive). The adhesive can be applied to the back sealing layer 82 prior to application of the fibers. By curing the adhesive with the backing layer 90 in a flat, or planar, disposition, the at-rest configuration of the fibers is established to urge the diamond canvas toward a flat disposition when taken out of the tube. Once cured, the bamboo fiber-reinforced backing layer 90 will be flexible enough to allow the diamond art canvas 22 to be rolled up and placed within a tube 70. However, when the diamond art canvas 22 is removed from the tube 70 and unrolled, the bamboo fiber-reinforced backing layer 90 will urge the diamond art canvas 22 toward a flat orientation, resisting curled edges or wrinkles.

The composite backing layer 90 can be applied and configured in other ways. For example, in another variation fibers can be coated with adhesive and sprayed onto the back sealing layer 82. Alternatively, an adhesive can be applied to the back sealing layer 82 and a woven or non-woven fabric made up of fibers having the desired tensile strength and Young's modulus characteristics can be applied to the adhesive. Such application preferably is performed while the substrate 24 is flat so that the at-rest configuration of the backing layer 90 (and the fibers that make it up) is flat.

In some variations, the backing layer 90 can be applied to the back sealing layer 82 prior to printing an image on the print layer 86 or flash layer 88.

In still another variation, the textile layer can comprise a fabric made up of the same or similar fibers as are used in the backing layer. Such fibers can be bamboo fibers and/or other fibers having the desired tensile strength and Young's modulus characteristics as discussed herein. By way of example and not limitation, the various aspects discussed herein has been discussed in relation to bamboo fibers. However, other fibers can be used instead of or in combination with bamboo fibers. These other fibers include but are not limited to hemp fibers, fibers from the ramie plant, flax fibers, jute fiber, kenaf or *hibiscus cannabinus* fiber, sisal or agave sisalana fiber, pineapple or *Ananas comosus* fiber, coconut coir fiber, or combinations thereof.

The embodiments discussed above have disclosed structures with substantial specificity. This has provided a good context for disclosing and discussing inventive subject matter. However, it is to be understood that other embodiments may employ different specific structural shapes and interactions.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above.

What is claimed is:

1. A diamond art canvas, comprising:
a substrate having a front side and a back side, the substrate comprising a flexible textile, a print layer defined on a front side of the textile layer, and a backing layer defined on a back side of the textile layer;
an image printed upon the print layer, the image including a plurality of markers with unique printed indicia;
an adhesive applied to the image surface;
a plurality of unique diamond drills attachable to the substrate via the adhesive and attachable in a pattern corresponding to the unique printed indicia;
a protective film disposed atop the adhesive, the protective film configured to be releasably removed from and reengaged with the adhesive;
the backing layer comprising a composite comprising a plurality of bamboo fibers entrained in an adhesive, each of the plurality of fibers having a length, the backing layer configured so that an at-rest condition of the fibers in the backing layer are in a random order; and
the bamboo fibers having an elastic limit so that the diamond art canvas can be rolled into a 1 inch to 3 inch inner diameter tube without exceeding the elastic limit of the bamboo fibers and when the diamond art canvas is removed from the tube, the bamboo fibers urge the diamond art canvas to lay flat.

2. The diamond art canvas of claim 1, wherein the fibers have a tensile strength less than about 2000 MPa and a Young's modulus less than about 45 GPa.

3. The diamond art canvas of claim 2, wherein the fibers have a tensile strength greater than about 900 MPa and less than about 1800 MPa and a Young's modulus greater than about 20 GPa and less than about 40 GPa.

4. The diamond art canvas of claim 3, wherein the fibers have a Young's modulus greater than about 25 GPa.

5. The diamond art canvas of claim 3, wherein the fibers comprise bamboo fibers.

6. The diamond art canvas of claim 5, wherein the fibers have a tensile strength between about 930-1770 MPa and a Young's modulus of between about 26-35 GPa.

7. The diamond art canvas of claim 5, wherein the plurality of fibers are randomly disposed in the backing layer.

8. The diamond art canvas of claim 7, additionally comprising a cylindrical tube having a diameter no more than about 3 inches, wherein the fibers are selected to be flexible enough so that the diamond art canvas can be rolled up and deposited into the tube, and the fibers are selected to be stiff enough so that when the diamond art canvas is removed from the tube and unrolled the backing layer urges the diamond art canvas toward a planar at-rest configuration.

9. A method of making a diamond art painting kit, comprising:
forming a substrate, comprising:
applying a back sealing layer to a back side of a textile layer;
applying a front sealing layer to a front side of the textile layer;
apply a backing layer behind a back side of the textile layer, the backing layer comprising a composite having a plurality of bamboo fibers entrained in an adhesive, the bamboo fibers having an elastic limit which is not exceeded when the diamond art canvas is rolled and placed within a 1 inch to 3 inch inner diameter tube; and
curing the backing layer when the textile layer is lying flat so that an at-rest configuration of the fibers in the backing layer, when cured, is in a non bent state.

10. The method of claim 9, additionally comprising:
applying an image to a front surface of the substrate;
applying an adhesive layer atop the image; and
applying a removable protective film to the adhesive layer.

11. The method of claim 10, additionally comprising rolling the diamond art canvas and placing the rolled diamond art canvas into a cylindrical tube.

12. The method of claim 10, wherein the backing layer is applied prior to the image being applied.

13. The method of claim 9, wherein the fibers of the composite layer are bamboo fibers.

14. The method of claim 9, wherein the fibers of the composite layer have a tensile strength between about 900-1800 MPa and a Young's modulus between about 20-40 GPa.

15. The method of claim 14, wherein the fibers of the composite layer have a tensile strength between about 930-1770 MPa and a Young's modulus of between about 26-35 GPa.

16. The method of claim 15, wherein the fibers of the composite layer are bamboo fibers.

17. The method of claim 9, wherein applying the backing layer comprises applying an adhesive to the back sealing layer and flocking bamboo fibers onto the adhesive.

18. The method of claim 9, wherein applying the backing layer comprises applying an adhesive to the back sealing layer and applying a textile comprising bamboo fibers onto the adhesive.

* * * * *